Figure 1:
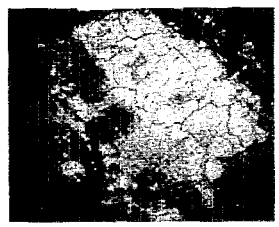

UNTREATED SOIL

SPENT CLAY TREATED
(LUBE)

SPENT CLAY TREATED
SUSPENSOID

2,760,308
SOIL STRUCTURAL IMPROVEMENT PROCESS

Robert Earl Emond, Mooretown, Ontario, Canada, assignor to Esso Research and Engineering Company, a corporation of Delaware Application September 8, 1953, Serial No. 379,016

5 Claims. (Cl. 47—58)

This invention relates to an improvement in soil structure caused by incorporating in a heavy clay soil up to 25% by volume spent clay after use in refining lubricating oils and petroleum distillates. It is taught herewith that dehydrated clays having adsorbed organic materials incorporated into a soil over a period of time undergo a weathering to form compounds that affect soil structure. By incorporating a petroleum refinery spent clay with clay soils, the soil structure is so changed that it becomes more workable, porous, easily drained and warmer.

To illustrate this new unexpected effect, a field experiment was conducted using two different soil amendments; one, hereafter called lube spent clay (the used catalyst after refining lubricating oils); the other, a suspensoid spent clay (the used catalyst after cracking petroleum distillates by the suspensoid cracking process).

The lube spent clay was dark brown in color and contained up to 30% by volume oil. When it was shaken for 10 minutes, 10% of its volume passed through a 120 mesh sieve.

The suspensoid spent clay was of similar particle size but black in color.

The kinds of clays obtained from refinery treatments as spent clays are those which have the property of adsorbing diolefins, sulfur compounds, oxygenated compounds and nitrogen compounds from petroleum products. Many of these refinery clays are naturally active clays of fuller's earth, which become activated by weathering, water leaching and dehydrating. Other clays which are naturally inactive, such as bentonites, are made active by acid treatment and dehydrating. Montmorillonite type clays are suitably activated by calcining at temperatures of 300°–600° F.

Regardless of the source of the clays, it is well known and well understood that the various active clays used in refinery treatments can be used repeatedly up to about ten times with intervening calcining treatments to remove portions of the adsorbed organic material. Finally, however, the more stably adsorbed organic material prevents further use of the active clay and that is when the clay becomes what is known as "spent clay." Thus, in general these adsorbent clays are dehydrated by calcination at above 300° F.

In recent exploratory studies, nearly 30% of the adsorbed oil was extracted from the spent clays in an extraction apparatus with solvent naphtha. The residual clay was dried and it then had a dark brown appearance. Water holding capacity studies were made using 10% of the extracted and dried spent clay in heavy clay soil with the following results:

|  | Maximum water holding capacity, percent |
|---|---|
| Heavy Clay Soil (no added spent clay) | 42.1 |
| Heavy Clay Soil + 10% spent clay | 52.4 |
| Heavy Clay Soil + 10% sand | 43.2 |

It is apparent that the water holding capacity of the natural clay soil was markedly increased by the addition of spent refinery clay. The initial active clay was not much more effective for changing the soil structure than the sand; whereas, the spent clay increased the water holding capacity by about 25% with respect to the natural water holding capacity.

Infrared spectrographic analysis of the spent refinery clay revealed that there was a significant peak indicating the presence of an active polar grouping, such as a cyano ($-C\equiv N$). The adsorbed organic material is insoluble in water but dissolves in ethyl alcohol to give an amber colored liquid.

While sand has a significant effect in increasing the porosity of a heavy clay soil so as to increase its water holding capacity, it is apparent from the table that the spent refinery clay is much more effective for this purpose than a substance like sand.

It has been noted by experts on soil that there is a great need for methods of improving soil structure. This is brought out in an article by E. W. Russell entitled "Soil Structure" published in Chemistry and Industry, May 31, 1952. This article points out the need for overcoming close packing.

It is to be understood that the spent active clays are the various magnesium- and calcium-alumina silicates that have the ability to adsorb organic compounds and highly unsaturated hydrocarbons from polymer oils. Any of such active clays containing such adsorbed components from mineral oils or treated to contain such organic materials may be employed after calcining and/or weathering for the purpose set forth of improving the soil structure, particularly to keep the soil crumbly when dry and to prevent the soil from becoming too compact when wet so that the soil will hold a larger amount of water. Advantageously the adsorbed materials are color bodies removed from petroleum oils and preferably the organic material content of the clay is reduced down to 1–10% when it is to be used with seed or fertilizers or is to be used added to soil to be seeded shortly afterwards.

Examples

Two treatments were made to plots 40 feet by 10 feet consisting of Brookston type clay soils, principally composed of Beidellite and Halloysite. Both treatments were applied at rates up to 25% by volume of the top four inches of soil. A third plot adjacent to the suspensoid clay plot was used as a check. Two years later the treated soil remained untouched, after which time the materials were dispersed into the soil by rotatilling. The following week several crops (gladioli, potatoes, onions) were planted in rows running through the treated plots.

(1) *Crops.*—Excellent crops of gladioli, potatoes, and onions were obtained from all three plots. No significant increase in crops were observed, but no damage from disease or other factors occurred to any of these three crops.

(2) *Workability of treated soil.*—When the soil was cultivated to eradicate weeds, the amount of power required by a 1.5 H. P. garden tractor to propel it through the plots was significantly changed as illustrated below.

|  | Amount of throttle required |
|---|---|
| Untreated | full |
| Spent lube clay | half |
| Spent suspensoid clay | half |

Figure 2:
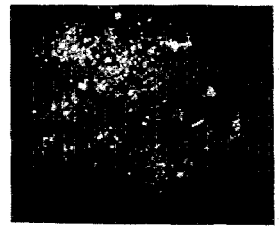
Figure 3:
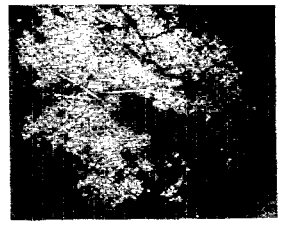

(3) *Soil structure.*—At harvesting, at the end of the second year, the photographs shown in the drawing as Figs. 1, 2, and 3, were taken of representative areas in the plots.

| Fig. 1 | Fig. 2 | Fig. 3 |
|---|---|---|
| Untreated Plot | Spent Lube Clay | Spent Suspensoid Clay. |

It will be observed from these pictures that the untreated soil has cracks up to 8 mm. wide about the thickness of a pencil, while the suspensoid clay has smaller cracks up to 4 mm., and the spent lube clay has a much more porous structure with no visible cracks. The soil from this plot shown in Fig. 2 remained friable during the summer, in spite of heavy rainfall followed by a prolonged period of drought (six weeks).

(4) *Water holding capacity.*—To determine the ability of these treated soils to hold water, duplicate soil samples were taken from moisture determinations at two different times of the year; early spring and early fall. The first group of determinations were carried out by a soils laboratory. The results of these samples obtained are given below:

|  | M.W.H.C.[1] 1st Spring | Moisture Equivalent[2] | |
|---|---|---|---|
|  |  | 2nd Spring | 3rd Fall |
| (1) Untreated Plot: |  |  |  |
| (a) | 66.41 | 25.92 | 46.1 |
| (b) | 68.78 | 27.22 | 44.9 |
| (2) Clay Soil and Lube Spent Clay: |  |  |  |
| (a) | 77.24 | 29.67 | 51.3 |
| (b) | 77.69 | 30.14 | 53.9 |
| (3) Clay Soil and Suspensoid Spent Clay: |  |  |  |
| (a) | 70.12 | 25.07 | 43.7 |
| (b) | 70.63 | 24.93 | 39.4 |

[1] M. W. H. C.—Maximum water holding capacity is the amount of water on an over dry basis that a sample of soil retains against a gravity pull of 1 cm.—i. e. the soil is essentially saturated.
[2] Moisture Equivalent—The amount of water (oven dry basis) that a soil will retain after the soil has been thoroughly wetted and allowed to drain 48 hours. It is essentially the wet limit, in the available range of soil moisture.

The above results and photographs demonstrated that the addition of lube spent clay to a heavy clay soil so changes the structure that it becomes more porous, hence increases drainage and make the soil more easily tilled. Observations indicate that the added spent clay remains active and effective for at least 3 years for improving working of the soil.

An efficient method of producing the kind of treated clays found satisfactory for soil improvement involves the steps of air-drying the clay in pulverized condition, suspending the clay in mineral oil containing the organic color bodies which are absorbed by the clay as the oil-clay slurry is heated to an elevated temperature, about 30° F. below the flash point of the oil, e. g. in the range of 300° to 600° F., separating moisture containing vapors, e. g. with vacuum, filtering, and washing the clay separated from the oil with naphtha to remove the more naphtha-soluble adsorbate. The washing with naphtha or similar low-boiling organic solvent, ether, alcohol, or the like, may be carried out in conjunction with the filtering, preferably at about 140° to 220° F. The wash solvent is rapidly and fully removed in a subsequent vacuum stripping. The washing, filtering and stripping may be repeated to lower the organic content of the treated clay down to about 1%. Preferably the stripping and/or weathering is carried out to remove volatile organic matter, such as fully vaporized at temperatures up to 600° F., and until from 1 to 10% of residual organic material is left on the clay.

A montmorillonite type clay, e. g. Pembina, having a base exchange capacity of 95 mg./100 g. after heating to 300 to 600° F. assumes a water-free configuration and remains so without again assuming the characteristics of the natural material. Both nitrogen and oxygen containing liquids swell these dehydrated materials lightly coated by heating in the presence of mineral lubricating oils, then dried, or solvent washed and dried to remove volatile and readily soluble organic adsorbate. However, if the oil treated clay materials become too highly heated they are "dead burned" and do not become swelled with adsorption of nitrogen and oxygen containing compounds. This accounts for greater effectiveness of the spent lube clays than "dead burned" suspensoid spent clay for improving natural clay soils.

It appears that the spent lube clay or similarly treated clay materials when mixed with a natural clay soil, like Brookston clay, prevents platelet particles from lining up when the soil is wetted. The increased water-holding capacity depends on the pore space. The darkened color of the treated clay assists in raising the soil temperature.

What is claimed is:

1. In the improvement of natural clay soil structure, admixing with a natural clay soil a calcined spent active clay containing adsorbed mineral oil components.

2. The improvement in a natural clay soil structure which comprises incorporating into a clay soil a substantial amount of a spent refinery clay which holds up to 30% by volume of adsorbed mineral lube oil color bodies calcined thereon.

3. In the producing of a soil additive active clay for improvement of a natural clay soil, the steps which comprise adsorbing on a dehydrated montmorillonite clay up to about 30% of organic color bodies from a petroleum lubricating oil, heating the clay and adsorbed organic material at 300° to 600° F. and weathering the calcined clay to leave 1 to 10% of organic material thereon prior to admixing the thus formed and weathered clay with the natural clay soil.

4. A spent montmorillonite type clay treated for use as a soil additive, which consists of said clay dehydrated, coated with mineral oil color bodies calcined at 300 to 600° F., with naphtha-soluble and volatile components removed therefrom.

5. In producing a soil additive active clay, the steps which comprise dehydrating the clay, depositing mineral oil color bodies by adsorption on said clay, calcining adsorbed color bodies on said clay at 300° to 600° F., removing a substantial amount of naphtha-soluble and volatile organic components from the clay to leave a spent clay containing from about 1 to 10% of residual organic material thereon.

References Cited in the file of this patent

UNITED STATES PATENTS

| 1,608,917 | Widdis | Nov. 30, 1926 |
| 2,291,226 | Higgins | July 28, 1942 |
| 2,392,518 | Barnhill | Jan. 8, 1946 |
| 2,571,380 | Penick | Oct. 16, 1951 |
| 2,572,433 | Bergstrom | Oct. 23, 1951 |
| 2,580,827 | Payne | Jan. 1, 1952 |

FOREIGN PATENTS

| 509,524 | Germany | Sept. 1, 1931 |
| 426,380 | Great Britain | Apr. 2, 1935 |

OTHER REFERENCES

Davis: "Bentonite, Its Properties . . . ," published 1940 as Technical Paper 609 by U. S. Department of Interior, Bureau of Mines, pp. 50, 51, 60, 61, 72, 73.

Chemical Abstracts, vol. 43, published 1949, columns 2721 and 2722, article "The Effect of Water-Soluble. . . ."